United States Patent [19]

Inaba et al.

[11] Patent Number: 4,966,738
[45] Date of Patent: Oct. 30, 1990

[54] MOLD CLAMPING FORCE ADJUSTMENT METHOD

[75] Inventors: Yoshiharu Inaba, Kawasaki; Masao Kamiguchi, Oshino, both of Japan

[73] Assignee: Fanuc Ltd., Minamitsuru, Japan

[21] Appl. No.: 340,008

[22] PCT Filed: Nov. 24, 1988

[86] PCT No.: PCT/JP88/01186
§ 371 Date: Apr. 13, 1989
§ 102(e) Date: Apr. 13, 1989

[87] PCT Pub. No.: WO89/06185
PCT Pub. Date: Jul. 13, 1989

[30] Foreign Application Priority Data

Dec. 25, 1987 [JP] Japan ................ 62-327517

[51] Int. Cl.$^5$ .................. B29C 45/64; B29C 45/76
[52] U.S. Cl. ................ 264/40.5; 264/328.1;
425/150; 425/589; 425/593; 425/595;
425/450.1; 425/451.6; 425/451.9
[58] Field of Search .............. 264/40.1, 40.5, 328.1;
425/150, 589, 592, 593, 595, 450.1, 451.5, 451.6,
451.9, 135

[56] References Cited

U.S. PATENT DOCUMENTS 4,849,151 7/1989 Tamura et al. ................ 425/150

FOREIGN PATENT DOCUMENTS 59-146825 8/1984 Japan.
62-32020 2/1987 Japan.

*Primary Examiner*—Jill L. Heitbrink
*Attorney, Agent, or Firm*—Staas & Halsey

[57] ABSTRACT

During a mold thickness adjustment process of an injection molding machine, a mold touch position at which the mold halves of a mold contact each other is detected, and the mold temperature is detected by means of thermocouples attached to the mold halves, respectively. Also, the mold thickness is obtained based on the position where a movable platen and a stationary platen of the injection molding machine contact each other, which is obtained previously, and the detected mold touch position.

After a molding operation is started, the mold temperature (Tn1, Tn2) is detected in each of molding cycles, and the amount of change of the mold thickness (Δe) during the period between the preceding cycle and the current cycle is calculated (S14) based on the change of mold tempreature (ΔT) during the period between the two cycles, the mold thickness (e), and the thermal expansion coefficient (k). The mold touch position for the current cycle (P) is obtained (S16) based on the calculated value. When the mold is clamped in the current cycle, the movable platen is moved from the mold touch position toward the stationary platen by a predetermined amount, to produce a predetermined mold clamping force.

3 Claims, 3 Drawing Sheets

MOLD CLAMPING FORCE ADJUSTMENT METHOD

TECHNICAL FIELD

The present invention relates to a mold clamping force adjustment method capable of maintaining the mold clamping force of an injection molding machine at a constant value.

BACKGROUND ART

In an injection molding machine which comprises a mold half mounted to a movable platen and having a core plate, and another mold half mounted to a stationary platen and having a cavity plate, the mold clamping or locking force is produced as the movable platen is moved along tie bars over a small distance from a mold touch position in which the core plate of one mold half closely contacts the cavity plate of the other without leaving any clearance, toward the stationary platen to a lockup position. The mold clamping force, i.e., the compressive force acting on the mold halves when they are locked up, is equivalent to the internal stress of the tie bars, which are made of an elastic material, produced when the movable platen is held in the lockup position. At this time, the tie bars expand slightly. The mold clamping force is therefore determined definitely by the expansion of the tie bars produced at the time of the lockup. To adjust the mold clamping force in practice, the expansion of the tie bars is adjusted by varying the small amount of movement which the movable platen makes between the mold touch position and the lockup position, i.e., the drive amount by which the movable platen is driven.

Therefore, in setting the mold clamping force during a molding operation, only data on the drive amount and the mold touch position where the drive of the movable platen is started are required. Generally, the mold touch position is detected during mold thickness adjustment, with a mold mounted on the injection molding machine, and the mold touch position and the drive amount are set in the control section of the injection molding machine, so that the mold clamping operation is performed in accordance with the set values.

However, the mold touch position, which is determined in accordance with the mold thickness, varies with lapse of time depending on the expansion and contraction of the mold caused by temperature changes, while the actually used mold touch position and the drive amount remain constant as set during the mold thickness adjustment. Therefore, if the temperature of the mold decreases after the mold thickness adjustment, the mold clamping force actually obtained will be insufficient, whereas if the mold temperature increases after the mold thickness adjustment, the mold clamping force obtained will be greater than necessary, thus failing to keep the mold clamping force constant.

A countermeasure conventionally employed to eliminate such disadvantage is to perform the mold thickness adjustment for detecting the mold touch position after the temperature of the mold has reached a thermal equilibrium in which the mold thickness is stable. Therefore, even in the case of using a resin with which molding conditions are never influenced by changes of the mold temperature, molding operation cannot be started immediately after the mold is mounted on the injection molding machine.

Even after the mold temperature has reached a thermal equilibrium, it is still difficult to keep the mold temperature constant all the time since it can be influenced by changes in ambient temperature. For example, while unmanned operation of the injection molding machine is continued for a long period of time, the mold temperature may be changed due to the influence of the ambient temperature so that the mold clamping force varies correspondingly, thus possibly causing defective molding.

DISCLOSURE OF THE INVENTION

The object of the present invention is to provide a mold clamping force adjustment method capable of constantly maintaining the mold clamping force of an injection molding machine at a constant value.

In order to achieve the above-mentioned object, the present invention comprises the steps of: (a) detecting and storing a mold touch position, the thickness and the temperature of the mold during a mold thickness adjustment process; (b) detecting the temperature of the mold in each molding cycle after a molding operation that includes a sequence of molding cycles is started; (c) obtaining the thickness of the mold in each of the molding cycles, based on the detected temperature of the mold and the temperature and thickness of the mold which are stored in step (a); (d) obtaining a position of a movable platen necessary for producing a predetermined mold clamping force, based on the thickness of the mold obtained in step (c); and (e) producing the predetermined mold clamping force by moving the movable platen to the position obtained in step (d).

According to the mold clamping force adjustment method of the present invention, since the mold clamping force can be kept constant all the time without being affected by changes in temperature of the mold, the mold thickness adjustment can be carried out before the mold mounted on the injection molding machine reaches a thermal equilibrium in which the dimensions of the mold are stable. In the case of using a resin where molding conditions are not affected by changes of the mold temperature, the molding operation can be started immediately after the mold thickness adjustment process is executed with the mold mounted on the injection molding machine, thereby improving the operation efficiency. Even if the the mold temperature varies due to external factors such as a change in ambient temperature, the mold clamping force can be kept constant all the time. Therefore, unlike the known art, the mold clamping force is not reduced even when the mold contracts with a decrease in temperature during an unmanned operation of the mold injection machine for a long period of time. Thus, unfavorable incidents such as production of flashes can be avoided and the reliability of unmanned operation of the injection molding machine is enhanced.

BEST MODE OF CARRYING OUT THE INVENTION

Figure 1:
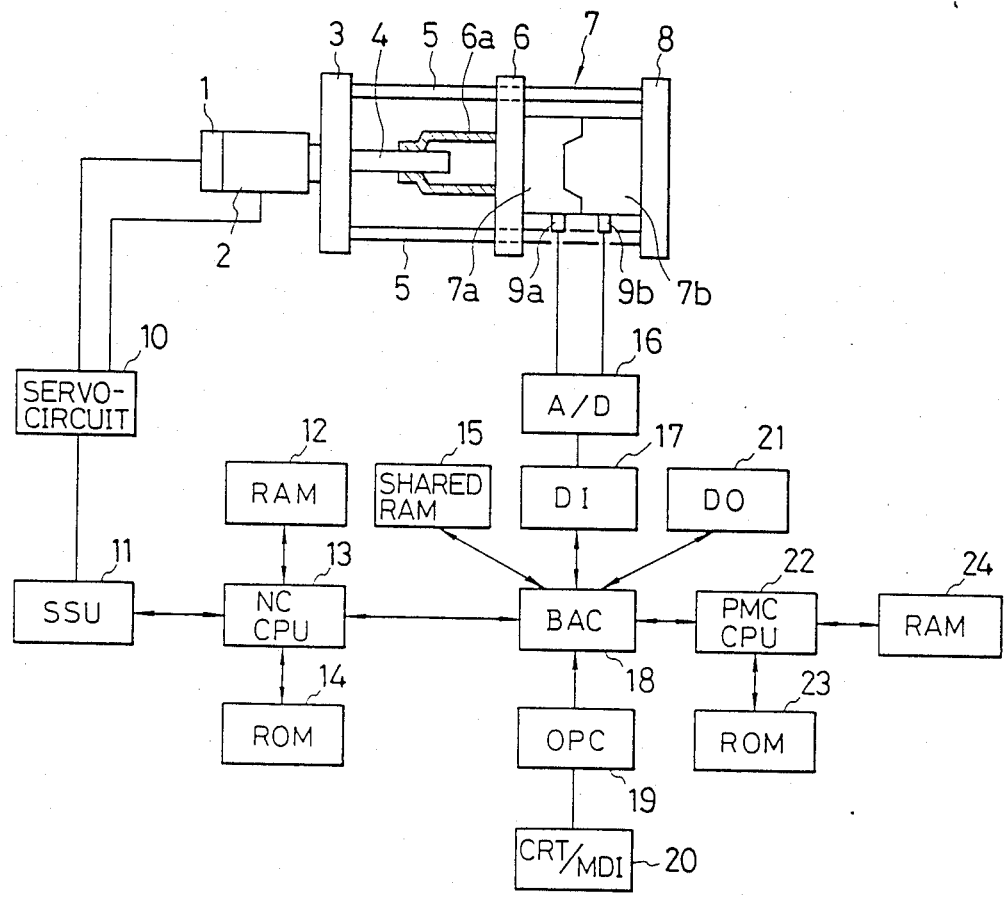
FIG. 1 is a diagram showing, partly in blocks, a principal part of an injection molding machine to which is applied a mold clamping force adjustment method according to an embodiment of the present invention.

Referring to FIG. 1, a rear platen 3 and a stationary platen 8 are coupled to each other by means of tie bars 5 made of an elastic material. A servomotor 2 for a clamping axis, which is fixed to the rear platen 3, has its shaft secured to a ball screw 4 for rotating the ball screw 4, so as to cause a sliding movement of a movable platen 6 having an end face to which a ball nut 6a screwed onto the ball screw 4 is secured along the tie bars 5 for various processes, i.e., mold closing, mold opening, mold clamping, and mold thickness adjustment. FIG. 1 shows only those elements associated with the clamping axis of the injection molding machine, which has a similar arrangement for an injection axis, screw rotation axis, ejector axis, etc. as that of a conventional injection molding machine. Reference numeral 7 denotes a mold comprising a mold half 7a mounted to the movable platen 6 and having a core plate, and another mold half 7b mounted to the stationary platen 8 and having a cavity plate. To the mold halves 7a and 7b are attached thermocouples 9a and 9b, respectively, which constitute part of a mold temperature measuring means. The output terminals of the thermocouples 9a and 9b are connected to an input circuit 17 through an A/D converter 16 provided in a control section of the injection molding machine.

The control section of the injection molding machine has an NC micro processor (hereinafter referred to as "NCCPU") 13 and a CPU 22 for a programmable machine controller (hereinafter referred to as "PMCCPU"). Connected to the PMCCPU 22 are a ROM 23 storing therein a sequence program for controlling the sequence operation of the injection molding machine, etc., and a RAM 24 for temporal storage of data, etc. Connected to the NCCPU 13 is a ROM 14 storing therein a monitor program for globally controlling the injection molding machine. Also connected to the NCCPU 13 through a servo-interface 11 are servo-circuits for controlling respective servomotors which are provided respectively for an injection axis, clamping axis, screw rotation axis, ejector axis, and other axes. In FIG. 1, only a servo-circuit 10 associated with the servomotor 2 for the clamping axis is shown. A pulse coder 1 is attached to the servomotor 2 for detecting the rotational position thereof, and is connected to the servo-circuit 10 such that a signal therefrom is applied to the servo-circuit 10.

Reference numeral 15 denotes a nonvolatile shared RAM having a memory area for storing an NC program for controlling various operations of the injection molding machine, etc., and a memory area for storing various set values, such as the expansion coefficients of molds which will be described hereinafter, parameters, macro parameters, and the like. Reference numeral 18 denotes a bus arbiter controller (hereinafter referred to as "BAC") to which the respective buses of the NCCPU 13, PMCCPU 22, shared RAM 15, input circuit 17, and output circuit 21 are connected. Also connected to the BAC 18 through an operator panel controller (hereinafter referred to as "OPC") 19 is a manual data input device with a CRT display (hereinafter referred to as "CRT/MDI") 20. The BAC 18 controls the buses to be used. Reference numeral 12 denotes a RAM which is connected through a bus to the NCCPU 13 and utilized for temporal storage of data, etc.

The injection molding machine constructed in this manner is controlled as follows: In accordance with the NC program stored in the shared RAM 15 for controlling various operations of the injection molding machine and the sequence program stored in the ROM 23, the PMCCPU 22 executes sequence control while the NCCPU 13 distributes pulses through the serve-interface 11 to the servo-circuits 10 for various axes of the injection molding machine. Each of the servo-circuits 10 for the various axes controls the current to be passed through its corresponding servomotor, in accordance with an output representative of an error amount between a current position and a commanded position and supplied from an error register, which is incorporated in the respective servo-circuit and operable to subtract the pulses provided by the pulse coder 1 from the distributed pulses received through the servo-interface 11. Thus, each servo-circuit serves to control the output torque of its corresponding servomotor.

Figure 2:
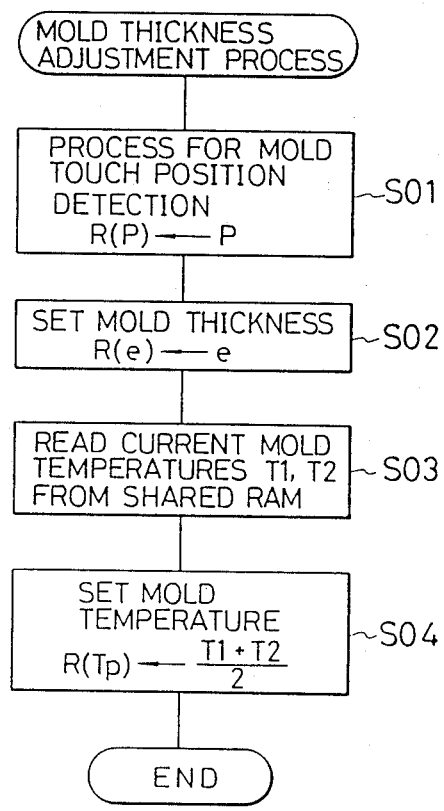
FIG. 2 is a flowchart illustrating a mold thickness adjustment process.

A mold clamping force adjustment method according to an embodiment of the present invention will now be described. When a new mold is mounted, a mold clamping force (plus the amount of movement necessary to produce the mold clamping force if it is not calculated by the PMCCPU 22 based on the mold clamping force) is set by an operator through the CRT/MDI 20. Then, a mold thickness adjustment process as shown in FIG. 2 is executed. First, the PMCCPU 22 executes a process for detecting the mold touch position, as is performed in the known art. The detected touch position p is stored in a first register R(p) (Step S01).

Next, the thickness e of the mold is obtained based on the touch position p, obtained as above, and the position at which the movable platen 6 contacts the stationary platen 8, obtained beforehand. The mold thickness is stored in a second register R(e) (Step S02). It is assumed that the leftward direction as viewed in FIG. 1 corresponds to the positive direction in the coordinate system of the movable platen 6. In the case where the coordinate system is set such that the position where the movable platen 6 contacts the stationary platen 8 corresponds to the origin point of the movable platen 6 in the coordinate system, the touch position p represents the mold thickness e. In this case, therefore, it is not necessary to store the mold thickness e in Step S02.

Then, current temperatures T1 and T2 of the mold halves 7a and 7b, which have been measured respectively by the thermocouples 9a and 9b, converted into digital values by the A/D converter 16 and stored in the shared RAM 15 through the input circuit 17 and the BAC 18, are read out (Step S03). A simple average of the mold temperatures T1 and T2 is calculated, and the value obtained is stored in a third register R(Tp) as a current temperature Tp of the mold 7 (Step S04).

In this manner, the mold thickness adjustment process is completed.

Figure 3:
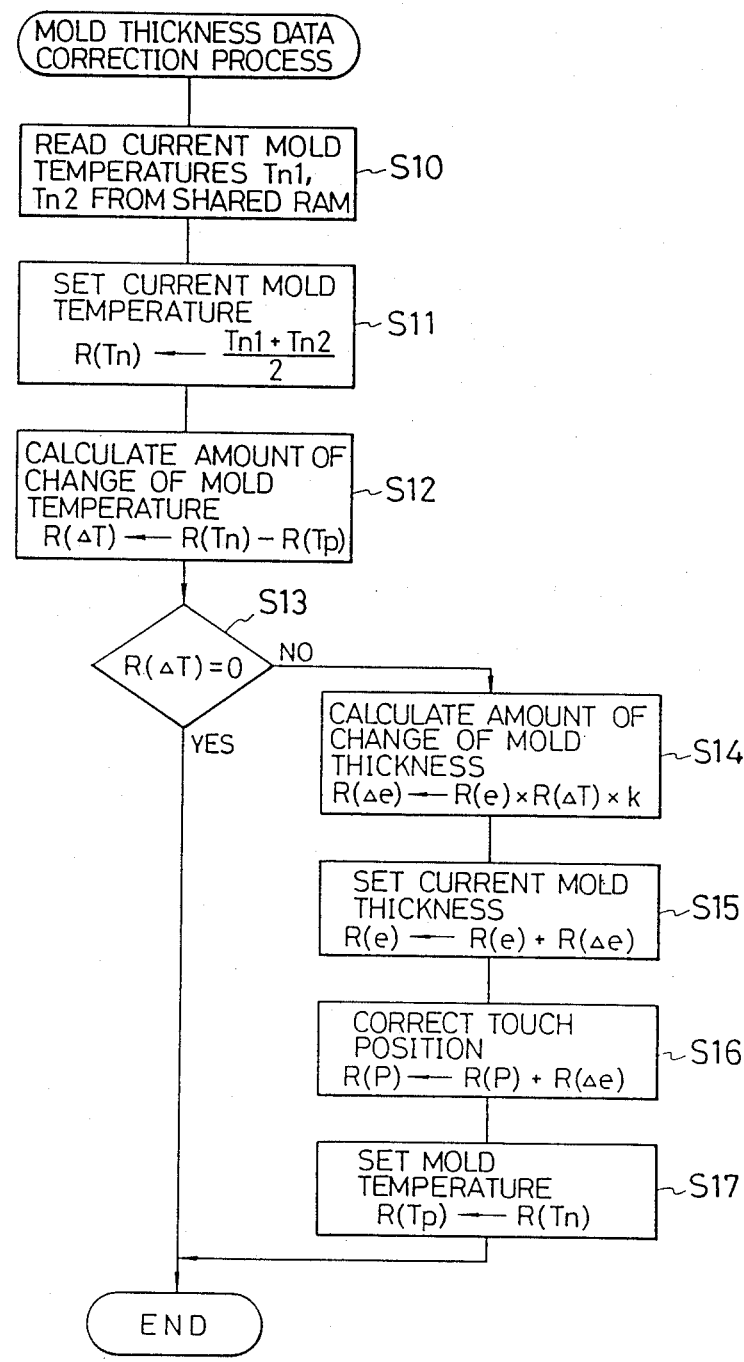
FIG. 3 is a flowchart illustrating a mold thickness data correction process.

After the start of a molding operation wherein a molding cycle is repeated sequentially, a process for mold thickness data correction, as shown in FIG. 3, is executed upon completion of each molding cycle. The PMCCPU 22 first reads the current mold temperatures Tn1 and Tn2 of the mold halves 7a and 7b (Step S10), which have been stored in the shared RAM 15 as mentioned above. The PMCCPU 22 then calculates a simple average of the read-out temperatures, and the value calculated is stored in a fourth register R(Tn) as a current mold temperature Tn (Step S11).

Next, the mold temperature Tp measured and stored in the previous molding cycle (or the mold temperature Tp set in Step S04 of FIG. 2 at the start of the molding operation) is subtracted from the mold temperature Tn measured and stored in the current molding cycle. In other words, an amount of temperature change ΔT of the mold during the period from the previous molding cycle to the current cycle is calculated. The amount of temperature change ΔT thus obtained is stored in a fifth register R(ΔT) as representing the amount of temperature change of the mold 7 (Step S12).

It is then determined whether the amount of temperature change ΔT of the mold 7, obtained in Step S12, is equal to a predetermined amount, e.g., zero (Step S13). If the amount of temperature change ΔT of the mold 7 is not equal to zero, that is, the temperature of the mold 7 has changed during the period between the previous and current molding cycles, an amount of expansion Δe of the mold 7 produced during the period from the previous molding cycle to the current cycle is calculated by multiplying the mold thickness e stored in the second register R(e), by the amount of temperature change ΔT of the mold 7, and also by a thermal expansion coefficient k which is set previously. The expansion amount Δe of the mold 7 is stored in a sixth register R(Δe) (Step S14). The value of the expansion amount Δe may be positive or negative depending on the sign of the value representing the amount of temperature change ΔT. If the sign of the expansion amount Δe is negative, then it follows that the mold has contracted.

Next, the mold thickness data is corrected, by adding the expansion amount Δe of the mold 7 during the period between the previous and current molding cycles, obtained in Step S14, to the mold thickness e which was set or corrected in the previous molding cycle, and the value obtained is stored in the second register R(e) as the mold thickness data (Step S15). The expansion amount Δe is also added to the touch position stored in the first register R(p), and the obtained value is stored in the register R(p) (Step S16). In the case where the coordinate system of the movable platen 6 is set such that the position at which the movable platen 6 contacts the stationary platen 8 coincides with the origin point of the movable platen 6 in the coordinate system, the touch position value stored in the first register R(p) is equal to the mold thickness value stored in the second register R(e) since the mold thickness e is equal to the touch position p. In this case, therefore, either one of Steps S15 and S16 may be provided so that the register R(e) or R(p) may store the mold thickness data and the touch position data. Subsequently, the content of the first register R(Tp) then storing the mold temperature of the previous molding cycle is replaced with the value stored in the register R(Tn) representing the mold temperature of the current molding cycle (Step S17). In this manner, when the current molding cycle is completed but the next molding cycle is not yet started, a new mold touch position p based on the amount of temperature change of the mold during the period between these two cycles is stored in the first register R(p).

In a mold touch process of the subsequent molding cycle, the movable platen 6 is moved to the touch position stored in the first register R(p). Then, a lockup process for providing the set mold clamping force, an injection process, a hold process, a cooling process and a metering process are executed, thus completing one molding cycle. Similar processes are executed in each of subsequent molding cycles. More specifically, by executing the aforementioned mold thickness data correction process for each molding cycle, actual mold thickness and touch position at a current time are obtained based on the amount of temperature change ΔT of the mold 7 during the period between the previous and current molding cycles, the mold thickness data set or corrected in the previous cycle, and the thermal expansion coefficient k of the mold 7. Since the position at which the drive of the movable platen is started in the mold clamping process of each molding cycle, i.e., the mold touch position, is automatically corrected in accordance with temperature changes of the mold, the mold clamping force can be kept constant all the time without requiring any change of the drive amount set at the end of the mold thickness adjustment.

The mold thickness data correction process mentioned above may be executed at any time as long as it is done before the mold clamping process. However, the most preferable time is immediately before the mold closing process.

Although, in the above embodiment, the mold touch position is corrected to keep the mold clamping force constant, the drive amount may alternatively be corrected based on the expansion amount Δe of the mold. In this case, instead of executing Step S16 for touch position correction, a drive amount L by which the movable platen 6 is to be driven may be obtained by subtracting the expansion amount Δe, obtained in Step S14, from the value stored in a register which stores the drive amount L, that is, L−Δe, and may be stored in the same register. An initial value of the drive amount L may be calculated based on the set mold clamping force, as well as on the mold touch position obtained during the execution of the mold thickness adjustment process shown in FIG. 2.

The foregoing embodiment is explained with reference to a direct mold clamping system. The invention may alternatively be applied to a toggle type mold clamping system and, in this case, the position of the rear platen 3 may be corrected in accordance with the amount of change Δe of the mold thickness.

In the above embodiment, moreover, Steps S12 to S17 are executed to obtain the difference between the mold temperature measured in the previous molding cycle and the mold temperature measured in the current molding cycle, obtain the expansion amount Δe of the mold during the period between the previous and current molding cycles, and to obtain the mold thickness e by adding the expansion amount Δe to the mold thickness calculated in the previous molding cycle. Alternatively, the mold thickness e may be obtained in each molding cycle by obtaining a difference ΔT between the mold temperature Tp obtained during the mold thickness adjustment process and the mold temperature Tn measured in each molding cycle, and by obtaining the mold expansion amount Δe of each molding cycle based on the difference ΔT and the mold thickness e obtained during the mold thickness adjustment process (Step S02). In this case, however, the expansion amount Δe is calculated repetitively to obtain the mold thickness for each molding cycle even when the mold thickness once varies from the value Tp obtained during the mold thickness adjustment process but remains unchanged thereafter. As a result, the operation time required will be longer than in the embodiment of FIG. 3.

We claim:

1. A mold clamping force adjustment method for maintaining a mold clamping force of a molding machine at a constant value comprising the steps of:
   (a) detecting and storing a mold touch position, a thickness and a temperature of a mold during a mold thickness adjustment process;
   (b) detecting the temperature of the mold in each molding cycle after a molding operation that includes a sequence of molding cycles is started;
   (c) obtaining the thickness of the mold in each of the molding cycles, based on the detected temperature of the mold and the temperature and thickness of the mold which are stored in said step (a);
   (d) obtaining a position of a movable platen necessary for producing a predetermined mold clamping force, based on the thickness of the mold obtained in said step (c); and
   (e) producing and said predetermined mold clamping force by moving the movable platen to said position obtained in said step (d).

2. The mold clamping force adjustment method according to claim 1, wherein said mold touch position is corrected in accordance with the thickness of the mold obtained in each of the molding cycles, and said movable platen is moved from said corrected mold touch position by an amount of movement necessary to produce said predetermined mold clamping force, whereby said predetermined mold clamping force is produced.

3. The mold clamping force adjustment method according to claim 1, wherein a platen movement amount necessary to produce said predetermined mold clamping force is corrected in accordance with a difference between the thickness of the mold obtained in each of the molding cycles and the thickness of the mold obtained during the mold thickness adjustment process, and said movable platen is moved from the mold touch position obtained during the mold thickness adjustment process, by the corrected platen movement amount, whereby said predetermined mold clamping force is produced.

* * * * *